United States Patent [19]
Buchanan

[11] Patent Number: 5,204,527
[45] Date of Patent: Apr. 20, 1993

[54] NEUTRON PARTICLE ENERGY DETECTOR

[75] Inventor: Ronnie J. Buchanan, Duncan, Okla.

[73] Assignee: Halliburton Company, Duncan, Okla.

[21] Appl. No.: 667,927

[22] Filed: Mar. 12, 1991

[51] Int. Cl.$^5$ .......................... G01T 3/00; G01V 5/04
[52] U.S. Cl. ................. 250/390.07; 250/256;
  250/269; 250/370.05; 250/370.06; 250/390.01;
  250/391
[58] Field of Search ............... 250/338.3, 391, 390.07,
  250/390.01, 370.06, 370.05, 269, 256, 338.3

[56] References Cited

U.S. PATENT DOCUMENTS 4,303,343 12/1981 Patel et al. ........................ 356/432
4,866,607 9/1989 Anderson et al. ................. 364/422

OTHER PUBLICATIONS

"Neutron Spectrometer Detector System and Accessories 525" from EG&G Ortec, believed to be published at least one year prior to Feb., 1991.
"HE3 Proportional Counter General Data" from TGM Detectors, Inc., believed to be published at least one year prior to Feb., 1991.
"Saturn Canberra Gamma Ray Analysis System" from Canberra Industries, Inc. believed to be published at least one year prior to Feb., 1991.

Primary Examiner—Constantine Hannaher
Attorney, Agent, or Firm—James R. Duzan; E. Harrison Gilbert, III

[57] ABSTRACT

An apparatus and method utilize a neutron sensitive medium in which initially existing atoms of the medium are divided into particles, reaction energy and neutron energy. The medium undergoes polarization in response to the reaction energy and the neutron energy. This produces an electrical charge gradient which is proportional to the energies and which can be sensed and analyzed to indicate just the neutron energy.

32 Claims, 2 Drawing Sheets

NEUTRON PARTICLE ENERGY DETECTOR

BACKGROUND OF THE INVENTION

This invention relates generally to an apparatus and method for measuring neutron energy and more particularly, but not by way of limitation, to a neutron detector and method utilizing a lithium tantalate crystal disposed in an oil or gas well.

There are many areas in which neutrons need to be detected and their energy measured. Neutrons are used in logging oil and gas wells. Medical equipment uses neutrons which need to be sensed for providing diagnostic/therapeutical information. Nuclear reactors use and produce neutrons whose energy needs to be monitored. Neutrons are also monitored in outer space projects.

In well logging, for example, neutrons can be detected by presently known devices. These typically include a medium which undergoes nuclear reactions in response to neutrons entering the medium and striking nuclei in the medium. Lithium fluoride and gaseous helium-3 are examples of media which have been used in neutron detectors used in the oil and gas industry. Charged pairs of alpha particles (helium-4 atoms) and/or hydrogen atoms (hydrogen-1 and/or hydrogen-3) are generated in these media in response to neutrons striking the nuclei of the lithium or helium atoms. Upon passing into another medium outside the generating medium, these charged pairs are sensed and signals generated representing the energy of the impinging neutrons.

A shortcoming of the foregoing technique is that energy loss occurs when the charged pairs pass from one medium to another for detection. Lower energy resolution results. There is the need for an improved detecting technique which avoids this loss of resolution.

SUMMARY OF THE INVENTION

The present invention overcomes the above-noted and other shortcomings of the prior art by providing a novel and improved apparatus and method for measuring neutron energy. Measurement occurs without the loss caused by charged pairs passing from one medium into another medium. This enables the present invention to be used to provide neutron energy spectrum information in situations where there is currently no method known to be available (for example, when determining the neutron dose equivalent rate to personnel in a radiation field).

The present invention uses a medium whose electrical characteristic changes in response to the nuclear reactions which result from impinging neutrons whose energy is to be measured. This electrical characteristic is proportional to the neutron energy; therefore, the electrical change indicates the neutron energy.

The foregoing is accomplished in an apparatus for measuring neutron energy, comprising: means for producing nuclear reactions within itself in response to neutrons moving into the means, which means includes a single body to which the nuclear reactions are limited, which body comprises a medium wherein a nuclear reaction causes a potential difference between two sides of the body; and means, connected to the two sides of the body, for sensing the potential difference.

In a particular embodiment, the present invention includes a neutron detector, comprising a lithium tantalate crystal having opposed sides between which an electrical charge gradient is produced in response to a neutron entering the crystal and generating a nuclear reaction with a lithium atom in the crystal, the nuclear reaction including the production of an alpha particle and a hydrogen-3 atom and the release of energy Q and energy $E_n$. The particular embodiment further comprises means, connected to the opposed sides of the lithium tantalate crystal, for producing in response to the electrical charge gradient data representative of the energy $E_n$ of the neutron causing the nuclear reaction.

The present invention also provides a method of measuring neutron energy, comprising: placing a lithium tantalate crystal in a field of neutrons to be measured so that the crystal is polarized in response to each nuclear reaction between a neutron from the field and a lithium atom in the crystal; flowing an electrical current having a magnitude responsive to the polarization of the crystal; and determining in response to the electrical current the energy of the neutron from the field reacting with the lithium atom in the crystal.

Advantages of the present invention summarized above include: 1. the potential difference or polarization which is sensed to indicate the neutron energy occurs within the nuclear reaction medium itself; therefore, there is no loss of energy resolution due to the reaction products passing into another medium; 2. the crystalline energy-to-voltage medium provides for better efficiency compared to detectors using a gaseous medium of the same volume; 3. relatively simple external circuitry can be used to sense and measure the generated potential difference; 4. real time readout can be provided; 5. the sensed potential difference and signals provided in response thereto are directly related to the neutron energy so that little data interpretation or manipulation is required; and 6. the apparatus and method have a wide range of applications in the nuclear field.

Therefore, from the foregoing, it is a general object of the present invention to provide a novel and improved apparatus and method for measuring neutron energy. Other and further objects, features and advantages of the present invention will be readily apparent to those skilled in the art when the following description of the preferred embodiments is read in conjunction with the accompanying drawings.

DETAILED DESCRIPTION OF THE PREFERRED EMBODIMENTS

Figure 1:
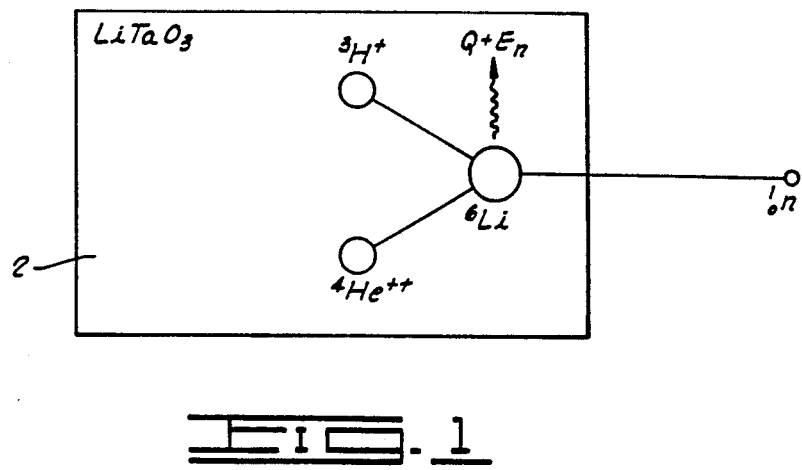
FIG. 1 is a schematic diagram illustrating a nuclear reaction which occurs within the neutron sensitive medium of the preferred embodiment of the present invention.

The preferred embodiments of the present invention utilize the lithium-6 ($^6$Li) reaction to impinging neutrons. The reaction of the preferred embodiments includes changing the polarization within a lithium tantalate crystal (LiTaO$_3$) so that a detectable electrical charge gradient proportional to the neutron energy is produced. A lithium tantalate crystal 2 and one lithium-6 reaction are schematically represented in FIG. 1. The reaction is represented as, follows:

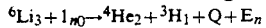

$$^6Li_3 + ^1n_0 \rightarrow ^4He_2 + ^3H_1 + Q + E_n$$

Figure 2:
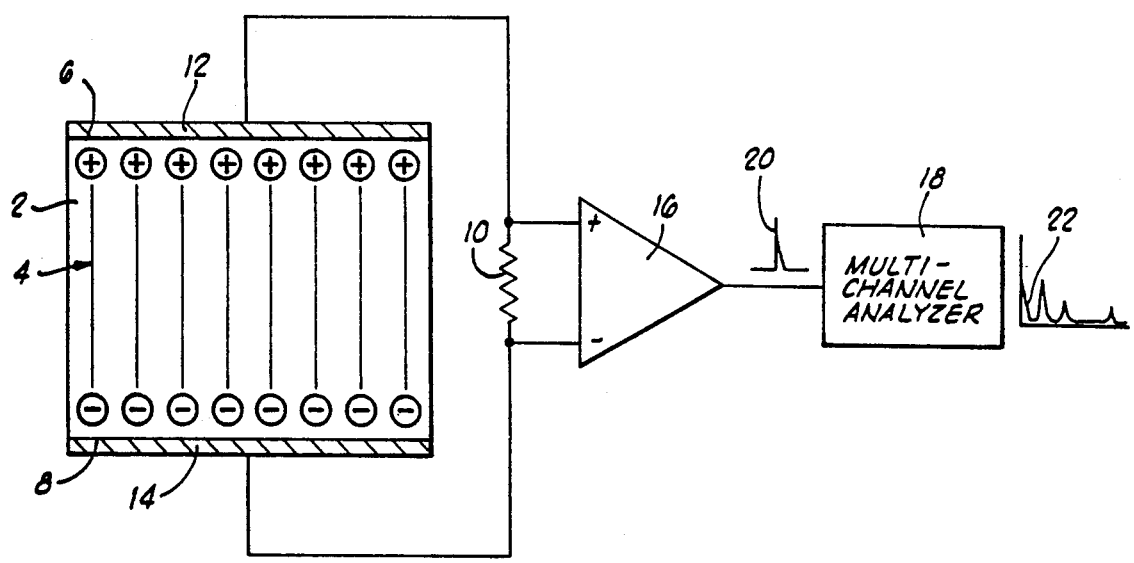
FIG. 2 is a schematic diagram of a preferred embodiment apparatus of the present invention.

The energy of the neutron, $E_n$, plus the energy from the nuclear fission, $Q=4.78$ MeV, are released in the crystal 2. This energy changes the polarization of the molecules in the crystal 2. This creates a small charge gradient 4 across the crystal 2 as illustrated in FIG. 2. The magnitude of the gradient, which is a potential difference or voltage, is proportional to the energy deposited or released within the crystal 2.

Lithium tantalate is a specific type of means for producing nuclear reactions within itself in response to neutrons moving into the means, but it is contemplated that other materials could be used if capable of producing a representative charge gradient. Lithium tantalate is particularly suitable for sensing neutron energy because it is a pyroelectric material, namely, one wherein an electric charge is generated in a crystal by a change in temperature. In the present invention the change in temperature occurs due to the energy released by the lithium-6 reaction. Although the pyroelectric nature of lithium tantalate is known (it is used in television sets to sense infrared), I am unaware of its application in sensing neutrons.

Lithium tantalate is also desirable because the reaction energy, Q, from the lithium-6 reaction is not large enough to propel the alpha particle far. The range of the alpha particle in this specific reaction is approximately 10 microns.

To allow lithium tantalate to be used in the apparatus of the present invention, the crystal is cut in a known manner to provide at least two sides between which the polarization occurs. This construction is illustrated in FIG. 2 wherein the crystal 2 has opposing sides 6, 8 between which the charge gradient 4 exists in response to the previously described nuclear reaction. The crystal 2 is limited in the preferred embodiments to a single body of the lithium tantalate medium so that nuclear reactions are limited to a single body or medium. This enhances the energy resolution as compared to prior types of neutron detectors which operate by sensing the reaction particles passing into another medium. In the present invention, the charge gradient, not the particles, is what is directly sensed.

The present invention further comprises means, connected to the opposed sides 6, 8 of the crystal 2, for producing in response to the electrical charge gradient 4 data representative of the total of the energy $E_n$ of the neutron causing the nuclear reaction. In the FIG. 2 embodiment, this means includes means for sensing the potential difference arising from the polarization. The sensing means of FIG. 2 includes a resistance 10 connected to the crystal 2 such as by electrodes 12, 14 bonded to the sides 6, 8, respectively, of the crystal 2. The electrodes 12, 14 should be perpendicular to the polarization axis as illustrated in FIG. 2. The resistance 10 should be large (such as in the k-ohms to M-ohms range) to allow a detectable current to flow through the resultant circuit. A large resistance is needed because the polarization effect includes a relatively small number of electrons.

Used in conjunction with the resistance 10 to enable sensing of the charge gradient 4 in the crystal 2 is an amplifier 16. Because of the small electron flow in the current through the resistance 10, the amplifier 16 is preferably a high gain, ultra low noise amplifier. It is contemplated that the amplifier preferably is one that can be readily custom designed and constructed by one skilled in the art for a particular implementation of the other components in a particular application. The inputs of the amplifier 16 are connected across the resistance 10 as shown in FIG. 2.

To determine the energy of the neutrons in response to the potential difference sensed by the resistance 10 and the amplifier 16, the preferred embodiment of the present invention illustrated in FIG. 2 further comprises a multichannel analyzer 18 of a type as known in the art. Examples of a suitable multichannel analyzer 18 are the Canberra Series 20 and Series 35 PLUS multichannel analyzers. The input of the multichannel analyzer 18 is connected to the output of the amplifier 16. The multichannel analyzer responds to an input signal by displaying a neutron energy spectrum in a known manner. An input signal 20 and an output spectrum 22 are illustrated in FIG. 2. The input signal 20 provides information responsive to the energy of each nuclear reaction. The multichannel analyzer 18 accumulates this energy information over a period time and then displays it as the output spectrum 22, which is a neutron energy spectrum. The energy of the neutron involved in a nuclear reaction within the crystal 2 is equal to the total detected energy minus the total of the known reaction energy Q. This follows from the equation set forth hereinabove.

Figure 3:
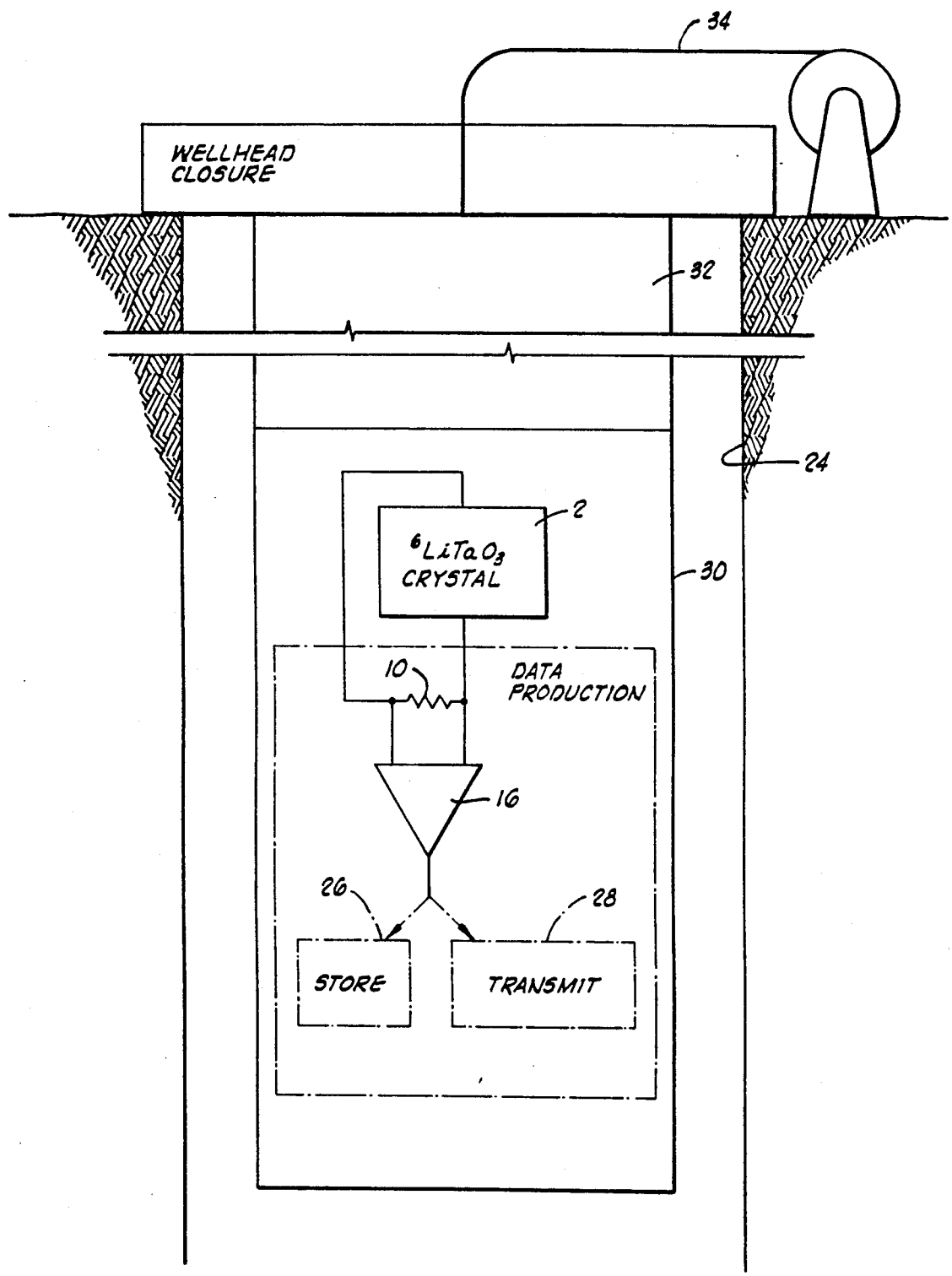
FIG. 3 is a schematic diagram of another preferred embodiment apparatus of the present invention.

Referring to FIG. 3, another preferred embodiment of the means for producing data in response to the electrical charge gradient 4 will be described. This means in the FIG. 3 embodiment includes means, connected to the sensing means (which again includes the resistance 10 and the amplifier 16), for processing the sensed potential in a well 24 (such as an oil or gas well) illustrated in FIG. 3. The means for processing the FIG. 3 embodiment includes either or a combination of means 26 for storing data about the sensed potential and means 28 for transmitting data representative of the sensed potential.

The storing means 26 can be implemented by reference to any suitable downhole data memory recorder. An example of such a recorder is disclosed in U.S. Pat. No. 4,866,607 to Anderson et al., incorporated herein by reference.

The transmitting means 28 can also be implemented by any suitable means. For example, signal transmission can be electrically along a wireline, acoustically along a tool string or by pressure pulse through fluid in the well. These are transmission techniques known in the art.

A combination of the two can be used, such as to first store data and then transmit it to the surface of the well 24.

To support the means for producing nuclear reactions and the means for producing data in response to the nuclear reactions, the embodiment shown in FIG. 3 also includes a housing 30 adapted to be lowered into the well 24. The housing 30 is of a conventional type such as known to be used with other types of neutron detectors used in wells. The housing 30 can be moved into and out of the well 24 in any known manner, such as on a tool string 32 or a wireline 34, both of which are represented in FIG. 3. Regarding the embodiment of FIG. 2, a suitable known type of housing can also be provided.

It is believed that the method of the present invention is apparent from the foregoing description of the illustrated preferred embodiments. As a summary, however, the method of the preferred embodiments comprises placing a lithium crystal in a field of neutrons to be measured so that the crystal is polarized in response to a nuclear reaction between a neutron from the field and a lithium atom in the crystal; flowing an electrical current having a magnitude responsive to the polarization of the crystal; and determining in response to the electrical current the energy of the neutron from the field reacting with the lithium atom in the crystal. The foregoing of course encompasses multiple neutrons, lithium atoms and nuclear reactions.

Flowing an electrical current occurs by connecting the resistance 10 across the crystal 2 and generating the charge gradient 4. In the FIG. 2 embodiment, determining the neutron energy includes connecting the multichannel analyzer across the resistance 10 (via the amplifier 16). In the FIG. 3 embodiment, determining the neutron energy can be accomplished in the same manner using the stored or transmitted data. Also with regard to the FIG. 3 embodiment, placing the crystal in a field of neutrons includes lowering the crystal into the well 24.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of measuring neutron energy, comprising:
    placing a lithium tantalate crystal in a field of neutrons to be measured so that the crystal is polarized in response to each nuclear reaction between a neutron from the field and a lithium atom in the crystal;
    flowing an electrical current having a magntiude responsive to the polarization of the crystal; and
    determining in response to the electrical current the energy of the neutron from the field reacting with the lithium atom in the crystal, including generating a neutron energy spectrum.

2. A method as defined in claim 1, wherein:
    said flowing an electrical current includes connecting a resistance across the crystal; and
    said determining the neutron energy includes connecting a multichannel analyzer across the resistance.

3. A method as defined in claim 1, wherein said placing a lithium tantalate crystal includes lowering the crystal into a well.

4. A method as defined in claim 1, wherein the nuclear reaction is confined wholly within the crystal.

5. An apparatus for measuring neutron energy, comprising:
    means for producing nuclear reactions within itself in response to neutrons moving into said means, said means including a single body to which said nuclear reactions are limited, said body comprising a medium wherein a nuclear reaction causes a potential difference between two sides of said body;
    means, connected to said two sides of said body, for sensing the potential difference; and
    means for determining an energy spectrum of the neutrons in response to the sensed potential difference.

6. An apparatus as defined in claim 5, wherein said medium includes lithium tantalate.

7. An apparatus as defined in claim 5, wherein:
    said medium includes a crystal having said two sides; and
    said means for sensing includes:
        a resistance connected to said two sides of said crystal; and
        an amplifier connected across said resistance.

8. An apparatus as defined in claim 7, wherien said means for determining includes a multichannel analyzer connected to said amplifier.

9. An apparatus as defined in claim 7, wherein said crystal includes lithium tantalate.

10. An apparatus as defined in claim 9, further comprising:
    means, connected to said means for sensing, for processing the sensed potential in a well; and
    a housing having said medium, said means for sensing and said means for processing disposed therein, said housing adapted to be lowered into a well.

11. An apparatus as defined in claim 10, wherein said means for processing includes means for storing in said housing data about the sensed potential.

12. An apparatus as defined in claim 10, wherein said means for processing includes means for transmitting data representative of the sensed potential 13. An apparatus as defined in claim 5, further comprising:
    means, connected to said means for sensing, for processing the sensed potential in a well; and
    a housing having said medium, said means for sensing and said means for processing disposed therein, said housing adapted to be lowered into a well.

14. An apparatus as defined in claim 13, wherein said means for processing includes means for storing in said housing data about the sensed potential.

15. An apparatus as defined in claim 13, wherein said processing includes means for transmitting data representative of the sensed potential.

16. A neutron detector comprising:
    a lithium tantalate crystal having opposed sides between which electrical charge gradients are produced in response to neutrons entering said crystal and generating nuclear reactions with lithium atoms in said crystal, each of said nuclear reactions including the production of an alpha particle and a hydrogen-3 atom and the release of energy Q and energy $E_n$; and
    means, connected to said opposed sides of said lithium tantalate crystal, for producing in response to the electrical charge gradients a neutron energy spectrum representative of the energies $E_n$ of the neutrons causing said nuclear reactions.

17. A neutron detector as defined in claim 16, wherein said means for producing includes:
    a resistance connected to said opposed sides of said lithium tantalate crystal so that current flows through said resistance in response to the electrical charge gradients;
    an amplifier connected across said resistance; and
    a multichannel analyzer connected to said amplifier.

18. A neutron detector as defined in claim 16, further comprising a housing having said lithium tantalate crystal and said means for producing disposed therein, said housing adapted for being lowered into a well.

19. A method of measuring neutron energy, comprising:

placing a lithium tantalate crystal in a field of neutrons to be measured so that the crystal is polarized in response to each nuclear reaction between a neutron from the field and a lithium atom in the crystal, wherein said placing a lithium tantalate crystal includes lowering the crystal into a well;

flowing an electrical current having a magnitude responsive to the polarization of the crystal; and determining in response to the electrical current the energy of the neutron from the field reacting with the lithium atom in the crystal.

20. An apparatus for measuring neutron energy, comprising:

means for producing nuclear reactions within itself in response to neutrons moving into said means, said means including a single body to which said nuclear reactions are limited, said body comprisign a medium wherein a nuclear reaction causes a potential difference between two sides of said body, said medium including a crystal having said two sides, said crystal including lithium tantalate;

means, connected to said two sides of said body, for sensing the potential difference, said means including:

a resistance connected to said two sides of said crystal; and an amplifier connected across said resistance;

means, connected to said means for sensing, for processing the sensed potential in a well; and a housing having said medium, said means for sensing and said means for processing disposed therein, said housing adapted to be lowered into a well.

21. An apparatus as defined in claim 20, wherein said means for processing includes means for storing in said housing data about the sensed potential.

22. An apparatus as defined in claim 20, wherein said means for processing includes means for transmitting data representative of the sensed potential.

23. An apparatus for measuring neutron energy, comprising:

means for producing nuclear reactions within itself in response to neutrons moving into said means, said means including a single body to which said nuclear reactions are limited, said body comprising a medium wherein a nuclear reaction causes a potential difference between two sides of said body;

means, connected to said two sides of said body, for sensing the potential difference;

means, connected to said means for sensing, for processing the sensed potential in a well; and a housing having said medium, said means for sensing and said means for processing disposed therein, said housing adapted to be lowered into a well.

24. An apparatus as defined in claim 23, wherein said means for processing includes means for storing in said housing data about the sensed potential.

25. An apparatus as defined in claim 23, wherein said means for processing includes means for transmitting data representative of the sensed potential.

26. A neutron detector, comprising:

a lithium tantalate crystal having opposed sides between which an electrical charge gradient is produced in response to a neutron entering said crystal and generating a nuclear reaction with a lithium atom in said crystal, said nuclear reaction including the production of an alpha particle and a hydrogen-3 atom and the release of energy Q and energy $E_n$;

means, connected to said opposed sides of said lithium tantalate crystal, for producing in response to the electrical charge gradient data representative of the energy $E_n$ of the neutron causing said nuclear reaction; and a housing having said lithium tantalate crystal and said means for producing disposed therein, said housing adapted for being lowered into a well.

27. A method of detecting neutron flux, comprising:

lowering a lithium tantalate crystal into a well;

exposing the lithium tantalate crystal to neutron impingement in the well; and measuring an output signal from the crystal.

28. A method as defined in claim 27, wherein the crystal has a pair of spaced opposing sides, and the otuput signal is measured at the sides.

29. A method as defined in claim 27, wherein neutron impingement with the crystal creates charged ions within the crystal.

30. A method as defined in claim 27, wherein the output signal is supplied to a multichannel analyzer to form an energy spectrum.

31. An energy measuring device responsive to neutron impingement, comprising:

crystalline lithium tantalate;

a housing for lowering said crystalline lithium tantalate into a well; and two electrodes connected to said crystalline lithium tantalate so that charge gradients exist between said electrodes in proportional response to energy deposited or released within said crystalline lithium tantalate by neutron impingement from within the well.

32. An energy measuring device as defined in claim 31, further comprising means for transmitting from the well data representative of said charge gradients.

* * * * *